(12) United States Patent
Kobayashi et al.

(10) Patent No.: US 6,775,215 B2
(45) Date of Patent: Aug. 10, 2004

(54) OPTICAL DISK APPARATUS, OPTICAL DISK RECORDING METHOD, AND OPTICAL DISK

(75) Inventors: Seiji Kobayashi, Kanagawa (JP); Kazumine Ito, Tokyo (JP); Toshihiro Horigome, Kanagawa (JP)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 09/874,280

(22) Filed: Jun. 6, 2001

(65) Prior Publication Data

US 2002/0024904 A1 Feb. 28, 2002

(30) Foreign Application Priority Data

Jun. 7, 2000 (JP) ........................................ 2000-175574

(51) Int. Cl.[7] .............................................. G11B 7/00
(52) U.S. Cl. ................................................ 369/53.21
(58) Field of Search ......................... 369/53.21, 30.03, 369/30.09, 30.1, 30.19, 30.21, 47.21, 47.22, 59.23, 84, 47.12, 47.19, 59.21; 380/201, 203; 705/51, 56, 57, 62; 360/60

(56) References Cited

U.S. PATENT DOCUMENTS

| | | | | |
|---|---|---|---|---|
| 4,606,016 A | * | 8/1986 | Verboom et al. | ........ 369/53.21 |
| 6,288,989 B1 | * | 9/2001 | Ro et al. | ................. 369/47.13 |
| 6,414,913 B1 | * | 7/2002 | Kobayashi et al. | ....... 369/47.13 |
| 6,560,179 B2 | * | 5/2003 | Park et al. | ................ 369/53.21 |
| 6,618,335 B2 | * | 9/2003 | Tanaka et al. | ........... 369/53.21 |
| 6,654,327 B2 | * | 11/2003 | Kobayashi | ............... 369/53.21 |
| 6,683,835 B2 | * | 1/2004 | Ko et al. | ................. 369/53.21 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

An optical disk apparatus for recording information of copyright on an optical disk where desired data are recorded by repetition of pits or marks. The apparatus comprises a recording means for recording the copyright information by irradiating a laser beam onto the optical disk in such a manner as to repeatedly form, in a predetermined area of the optical disk, local regions which cause greater changes in the return-light receiving result as compared with the pits or marks. On the optical disk, the existence ratio of the local regions for recording the copyright information is set to be less than 0.3 in the circumferential direction of the disk. In a reproduction mode, the copyright information recorded like a bar code for example can be exactly reproduced with certainty.

21 Claims, 7 Drawing Sheets

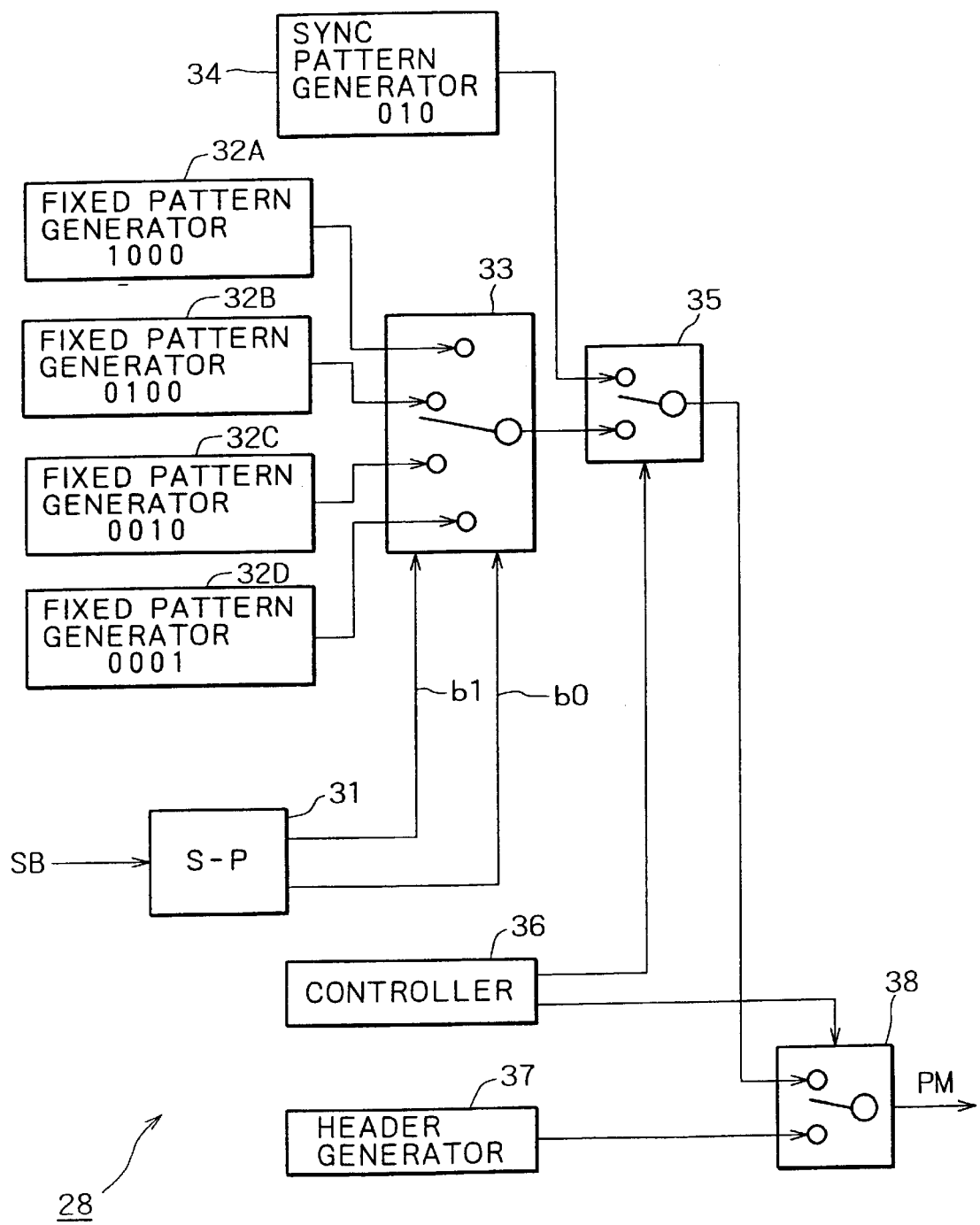

OPTICAL DISK APPARATUS, OPTICAL DISK RECORDING METHOD, AND OPTICAL DISK

BACKGROUND OF THE INVENTION

The present invention relates to an optical disk apparatus, an optical disk access method and an optical disk, and more particularly to those adapted for application to a disk recording/reproducing apparatus designed for mini disk (MD), compact disk (CD), digital video disk (DVD) and so forth. The present invention is so contrived that, when information of copyright is recorded by repeatedly forming local regions which cause greater changes in the return-light receiving result as compared with pits or marks, the existence ratio of such local regions in the circumferential direction of the disk is set to be less than 0.3, hence ensuring exact reproduction of the copyright information recorded like a bar code for example.

It is noticed recently that mini disk apparatus, which serve conventionally as optical disk apparatus, are diffused rapidly in use due to an advantage that music can be copied simply and easily from a variety of contents with prevention of deterioration in the tone quality. More specifically, in a mini disk apparatus, music information distributed through the Internet can be recorded on a mini disk for a test-listening, or music on a compact disk borrowed from a friend or the like can be recorded on a mini disk for a test-listening.

However, in such simplified easy copying achieved with prevention of any tone quality deterioration, there is possibility that, although a merit is attainable in enhancing the convenience for users, the profits of a copyrighter or a creater of the music may be impaired For this reason, various measures are discussed now for protection of copyrighters' profits in the world-wide groups and forums such as RIAA (Recording Industry Association of America), SDMI (Secure Digital Music Initiative), CPTWG (Copy Protection Technical Working Group) and so forth.

As one of such measures, there is proposed a method which records music information after encrypting the same by copyright protective information unique to each recording medium. According to this method, when the music information has been copied onto another recording medium, it becomes difficult to decrypt the information since the copyright protective information is different in each recording medium individually, thereby preventing unlimited copy to consequently protect the copyrighters' profits.

With regard to such copyright protective information recording system, there are proposed a method of forming a sector difficult to be accessed by users and recording copyright protective information in the sector, and a method of recording such information like a bar code by partially removing a reflective film with respect to recorded main data of pit rows (International Laid-open No. WO97/14144).

In the latter one of the above two methods for recording the copyright protective information like a bar code by partially removing a reflective film, a laser beam is modulated by a predetermined modulating signal and then is irradiated repeatedly onto an optical disk, wherein data to be recorded are processed through PE (Phase Encode) modulation to generate a modulated signal, thereby producing clock pulses from the reproduced signal and realizing reproduction of the data recorded like a bar code in unit of one bit.

In such bar-code recording based on the conventional method known heretofore, there exists a problem that the operation of an optical pickup is rendered unstable to consequently fail in exact reproduction of the copyright protective information.

More specifically, in the recording method mentioned above, the optical characteristic of an information recording film is changed locally and unreversibly by irradiation of a laser beam. Therefore, in the unreversible change of the optical characteristic derived from irradiation of a laser beam, a noticeable feature is such that the optical characteristic change on the information recording plane becomes great to eventually cause remarkable change in the quantity of return light obtained by irradiating the laser beam in a reproduction mode. Also in such bar-code recording, there is another feature that, in comparison with a case of using mark rows or the like, the local change extends over a relatively longer distance in the circumferential direction of the optical disk. And when accessing the region where the copyright protective information is recorded as mentioned, a time period, during which the return light of a sufficient quantity cannot be received in the optical disk apparatus, is rendered relatively longer to bring about a possibility of failure in executing proper focus control. And if such proper focus control is rendered difficult, it is considered that proper reproduction of the copyright protective information is also difficult in the optical disk apparatus.

SUMMARY OF THE INVENTION

It is an object of the invention to provide an optical disk apparatus, an optical disk recording method and an optical disk, wherein information of copyright can be reproduced exactly when such copyright information is recorded by repeatedly forming local regions which cause greater changes in the return-light receiving result as compared with pits or marks.

To achieve the above object, according to a first aspect of the present invention, there are provided an optical disk apparatus and an optical disk recording method, wherein a laser beam is irradiated to repeatedly form, in a predetermined area of an optical disk, local regions which cause greater changes in the return-light receiving result as compared with pits or marks, and information of copyright is recorded in such local regions. The existence ratio of the local regions in the circumferential direction of the optical disk is set to be less than 0.3.

According to a second aspect of the present invention, there is provided an optical disk wherein information of copyright is recorded in local regions which are formed repeatedly in a predetermined area of the disk by irradiation of a laser beam and cause greater changes in the return-light receiving result as compared with pits or marks, in such a manner that the existence ratio of the local regions in the circumferential direction of the optical disk is less than 0.3.

According to a third aspect of the present invention, there is provided an optical disk apparatus wherein copyright information recorded on an optical disk is reproduced through comparison of the sampling results obtained by sampling the return-light receiving result at predetermined timings.

With this configuration since the local regions causing great changes in the return-light receiving result are formed repeatedly in a manner that the existence ratio thereof in the circumferential direction of the disk is less than 0.3, even if a time period incapable of receiving the return light of a sufficient quantity is relatively long, it is possible to shorten such time period of an insufficient light quantity as a whole by comparison with the time period during which the return light of a sufficient quantity can be received. Consequently, it becomes possible to attain adequate setting to completely avoid undesired circumstances where proper focus control is rendered difficult, hence enabling exact reproduction of the copyright protective information.

Accordingly, the present invention can realize a satisfactory optical disk adapted for achieving certain reproduction of the copyright information.

Also according to the present invention, the copyright information recorded on an optical disk can be reproduced through comparison of the sampling results obtained by sampling the return-light receiving result at predetermined timings, so that even in case any change of a low-frequency signal level is generated in the return-light receiving result, a decision can be made as to the time point when the sampling result of the highest signal level has been obtained. Therefore, with application of the above to a case of recording the copyright information in local regions formed repeatedly to cause great changes in the return-light receiving result, it becomes possible to effectively avoid any harmful influence of the change of the low-frequency signal level even in case the 1-bit recording has a circumferentially long distance, hence realizing exact reproduction of the copyright information with certainty.

DETAILED DESCRIPTION OF THE PREFERRED EMBODIMENT

Hereinafter some preferred embodiments of the present invention will be described in detail with reference to the accompanying drawings.

(1) Structure of Embodiment

Figure 1A:
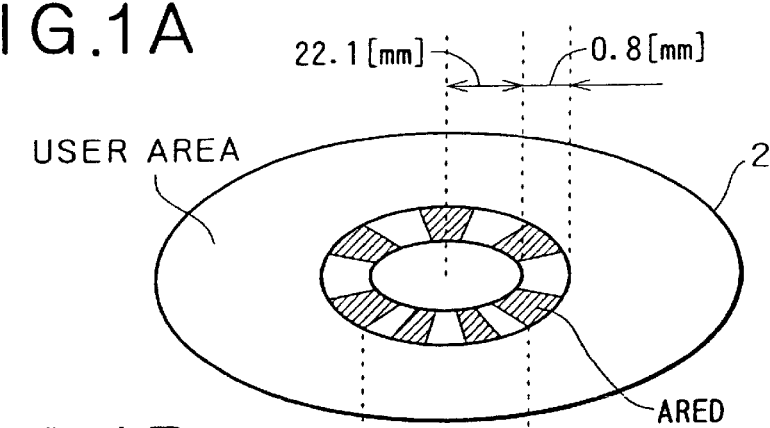
FIGS. 1A to 1D are schematic diagrams for explaining a mini disk used in the present invention.
Figure 1B:
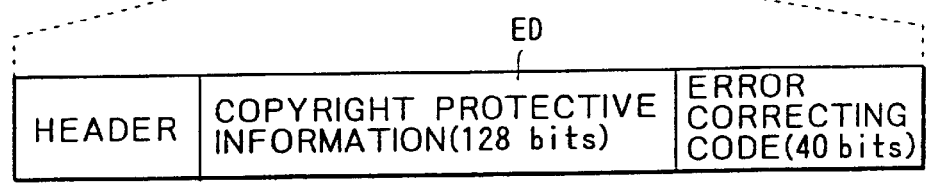
Figure 1C:
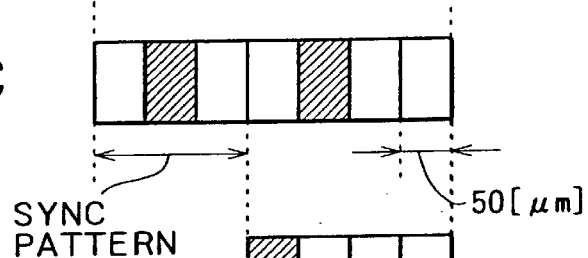
Figures 1, 1D:
Figures 1, 1D, 2:
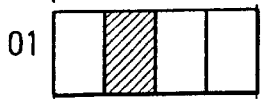
FIG. 2 is a flowchart showing a process of manufacturing the mini disk in FIG. 1.

FIG. 2 is a flowchart showing an optical disk manufacturing process in an embodiment of the present invention. In this embodiment, an optical disk manufacturing process 1 is employed to manufacture a mini disk 2 which contains recorded copyright protective information ED.

The copyright protective information ED is used for encrypting audio data and so forth to be recorded on the mini disk 2, and also for decrypting the audio data and so forth recorded on the mini disk 2. For example, the copyright protective information ED is composed of ID information unique to each mini disk, information of the relevant manufacturing factory, information of manufacture date, and information to control permission or prohibition of copying. In this embodiment, the copyright protective information ED is composed of 128-bit digital information for example, wherein a unique value is set per each mini disk differently from any other.

In the optical disk manufacturing process 1, an address encoder 6 supplies address information SA to a cutting machine 7, which then modulates a recording laser beam with such address information SA and irradiates the modulated beam onto a disk master 8. Subsequently the cutting machine 7 exposes the disk master 8 to thereby record the address information SA in the shape of meandering grooves or pit rows. The address information SA thus recorded is used for tracking control of the mini disk 2, and also for accessing the mini disk 2.

In the optical disk manufacturing process 1, the disk master 8 exposed by the cutting machine 7 as mentioned is developed at a succeeding step 9 of development, whereby fine rugged portions corresponding to the pit rows or grooves are formed in the exposed tracks.

At a next plating step 10, the disk master 8 is plated to produce a mother disk 12. In the optical disk manufacturing process 1, a stamper is produced from the mother disk 12 and, at an injection molding step 13, the stamper is molded by an injection molding machine to mass-produce disk substrates 14 each having the fine rugged portions copied from the mother disk 12.

At a next recording film forming step 15, a magneto-optical film is formed as an information recording film on the disk substrate 14 by a technique of sputtering or the like. And at a succeeding protective film forming step 17, a protective film is formed on the information recording film so as to ensure environmental resistance of the mini disk 2.

At a next step in the optical disk manufacturing process 1, the copyright protective information ED outputted from a signal source 16 is recorded by a bar code writer 18, and subsequently the mini disk 2 is packaged and shipped.

The bar code writer 18 modulates a high-output laser beam, which is emitted from a YAG (yttrium aluminum garnet) laser or the like, with the copyright protective information ED and then irradiates the modulated beam to an inner area of the mini disk 2 to change the information recording plane of the mini disk 2 locally and unreversibly by the copyright protective information ED, thereby recording the copyright protective information ED. At this time, the bar code writer 18 records the copyright protective information ED by irradiating a laser beam which is radially long and narrow in shape, thereby recording the copyright protective information ED like a bar code in a predetermined inner area of the mini disk 2. In this stage, the bar code writer 18 unreversibly changes the information recording film, which is composed of a reflective film, by irradiation of the laser beam to thereby unreversibly change the optical characteristic of the information recording plane.

FIG. 1A is a perspective view of such a mini disk 2 containing the copyright protective information ED recorded as mentioned. The copyright protective information ED is recorded like a bar code in a predetermined inner area ARED of the mini disk 2. The area ARED for recording the copyright protective information ED is set to 0.8 mm in width around a diameter of 22.1 mm.

The copyright protective information ED is recorded four times repeatedly along one round of the mini disk 2, so that even if some partial flaw or the like is induced, the copyright protective information ED can still be reproduced with certainty. In the copyright protective information ED, a header is assigned to its top as shown in FIG. 1B, so that the beginning of the recorded copyright protective information ED can be detected from the header. Further, a 40-bit error correcting code is assigned to the end of the copyright protective information ED for preventing any bit error. In this embodiment, the error correcting code is composed of Reed-Solomon code for example.

Out of the various data thus to be set, the header is represented by a logic level pattern of, e.g., 010001000100 which is not generated in the succeeding copyright protective information ED or error correcting code. As shown in FIGS. 1D-1 to 1D-4, each bit represented by a logic level corresponds to a minute sub-area of 50 μm in width formed by radially dividing the recording area ARED of the copyright protective information ED substantially in unit of 50 μm. In this embodiment, the light quantity of a laser beam is raised for each minute sub-area corresponding to logic 1, hence unreversibly changing the information recording plane relevant to the minute sub-area. Consequently, the circumferential length of 50 μm equivalent to the width of the minute sub-area is far greater than the length of each mark recorded as user data on the mini disk 2 through EFM (8–14) modulation. In this embodiment where the circumferential length of the minute sub-area is set to 50 μm, a laser beam emitted from a high-output YAG laser is irradiated onto the mini disk 2 via an objective lens having a relatively small numerical aperture NA, thereby realizing unreversible change of the optical characteristic of the information recording plane with a sufficiently high precision.

Meanwhile, the copyright protective information ED and the error correcting code are processed through 4-1 modulation in unit of 2 bits and then are recorded sequentially with a sync pattern interposed. In the sync pattern, three minute sub-areas mentioned above are assigned successively as shown in FIG. 1C, and the optical characteristic of the information recording plane is changed unreversibly with regard to only the center one of such continuous three minute sub-areas. Consequently, it becomes possible in this embodiment to attain proper timing coincidence in a reproduction mode, and due to insertion of a sync pattern per 2-bit recording, further exact timing coincidence is rendered attainable with certainty.

In contrast with the above, 4-1 modulation is executed in such a manner that, as shown in FIGS. 1D-1 to 1D-4 illustrating mutual correspondence to logic values of the copyright protective information ED and the error correcting code, the copyright protective information ED and the error correcting code are divided in unit of 2 bits, and bit strings are generated correspondingly thereto for unreversibly changing the optical characteristic of the information recording plane selectively with regard to one of four minute sub-areas, which succeed the sync pattern, in accordance with the logic values of the copyright protective information ED and the error correcting code.

More specifically, the 4-1 modulation is so executed that, when 2-bit data (b1, b0) of the copyright protective information ED and the error correcting code are logic 00, as shown in FIG. 1D-1, the data (b1, b0) are converted into logic 1000 so as to form a change of the information recording plane merely in the first one of the four minute sub-areas. When the 2-bit data (b1, b0) are logic 01, as shown in FIG. 1D-2, such data (b1, b0) are converted into logic 0100 so as to form a change of the information recording plane merely in the second one of the four minute sub-areas. Meanwhile, when the 2-bit data (b1, b0) are logic 10, as shown in FIG. 1D-3, the data (b1, b0) are converted into logic 0010 so as to form a change of the information recording plane merely in the third one of the four minute sub-areas. And when the 2-bit data (b1, b0) are logic 11, as shown in FIG. 1D-4, the data (b1, b0) are converted into logic 0001 so as to form a change of the information recording plane merely in the last one of the four minute sub-areas.

Thus, in this embodiment, the copyright protective information ED is recorded like a bar code by unreversible changes of the local information recording plane, and the existence ratio of such local regions having changes of the optical characteristic is set to be less than 0.3 in the circumferential direction of the optical disk.

That is, in recording the information through 4-1 modulation with a sync pattern assigned as mentioned, unreversible changes are formed with regard to two of the seven continuous minute sub-areas on the mini disk 2, so that the existence ratio of such regions in the circumferential direction of the disk 2 eventually becomes 2/7=0.285. Therefore, in this embodiment, exact focus control is achievable with certainty even in case the copyright protective information ED is recorded in a relatively longer distance as compared with marks or the like recorded on the mini disk 2 or with optical changes far greater than those of the marks. Consequently, even in case the optical changes are so given as not to attain substantially any return light from the information recording plane, if the existence ratio is set to be less than 0.3, it becomes possible to perform proper focus control practically in any of various optical disk apparatus. As a result, exact focus control can be carried out in this embodiment with a sufficiently wide margin.

Figures 1, 1D, 2, 3:
FIG. 3 is a block diagram showing a bar code writer in an embodiment of the present invention.

FIG. 3 is a block diagram of a bar code writer employed for recording such copyright protective information ED. In this bar code writer 18, a spindle motor 22 drives the mini disk 2 at a predetermined rotation speed under control of a spindle servo circuit 23, wherein an FG signal generator held in a bottom portion generates an output FG signal FG whose level rises per rotation of the mini disk 2 through a predetermined angle. The spindle servo circuit 23 controls the operation of the spindle motor 22 in such a manner as to rotate the mini disk 2 at a predetermined speed with reference to the FG signal FG.

A laser beam source 24 consists of a YAG laser and emits a high-output laser beam L1 intermittently in response to a modulated signal PM.

A mirror 25 refracts the optical path of the laser beam L1 and projects the same to the mini disk 2. An objective lens 26 consists of a cylindrical lens for example and condenses the reflected light from the mirror 25 onto the information recording plane of the mini disk 2. Then the bar code writer 18 changes the information recording film semipermanently by changing the composition of the information recording film or by evaporating the information recording film in accordance with the modulated signal PM, hence recording the copyright protective information ED like a bar code. In case the copyright protective information ED fails to be recorded in a radially sufficient width, the recording position may be shifted successively in the radial direction of the mini disk 2, so that it becomes possible to record the copyright protective information ED like a bar code by repeating such a recording operation.

An ECC (Error Correcting Code) circuit 27 attaches the error correcting code, which has already been described in connection with FIG. 1, to the copyright protective information ED outputted from the signal source 16, and then delivers its output data therefrom. And a 4-1 modulator 28 generates a modulated signal PM from the output data SB of the ECC circuit 27.

Figures 1, 1D, 2, 3, 4:
FIG. 4 is a block diagram showing a 4-1 modulator in the bar code writer of FIG. 3.
Figure 2:
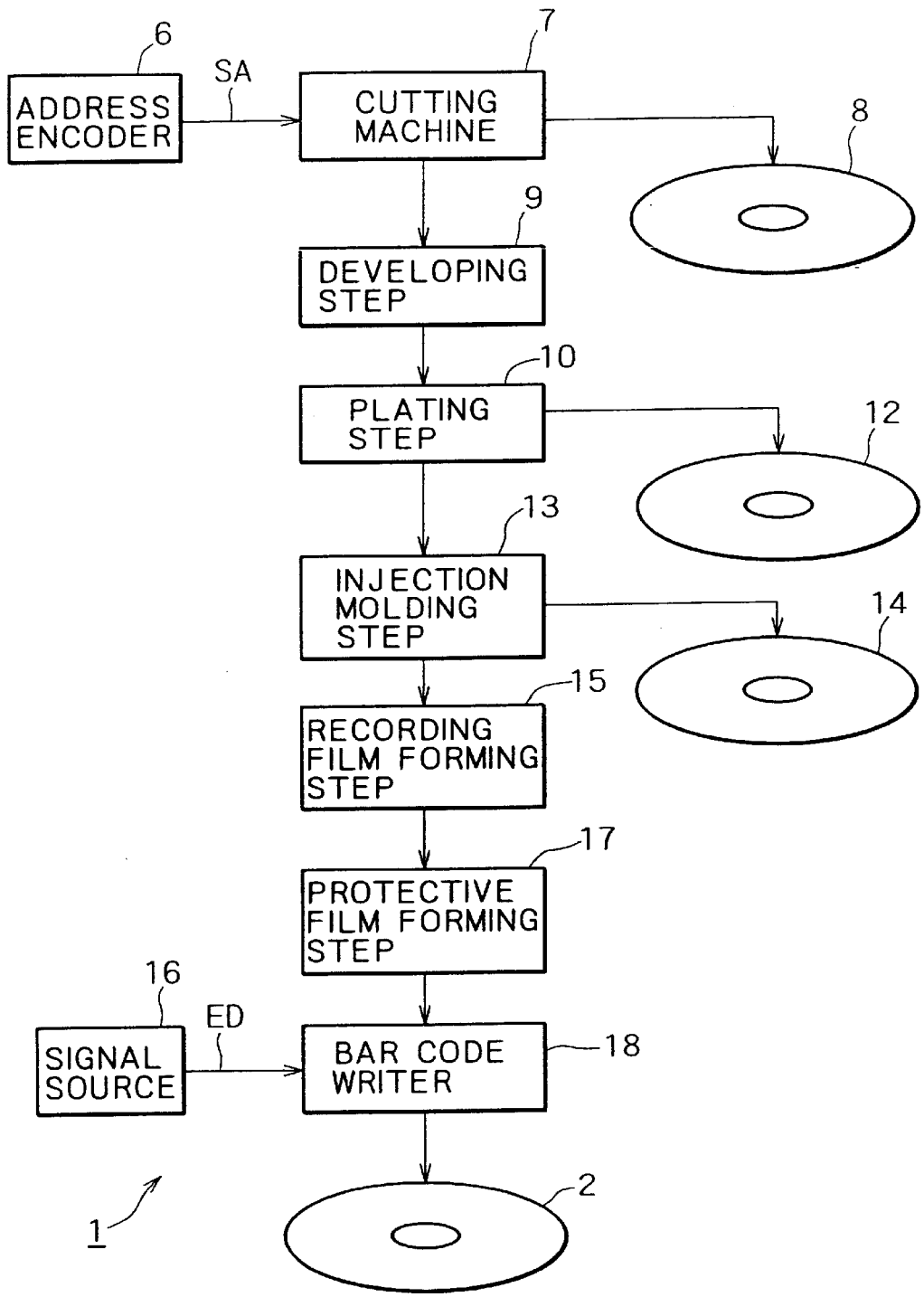
Figure 3:
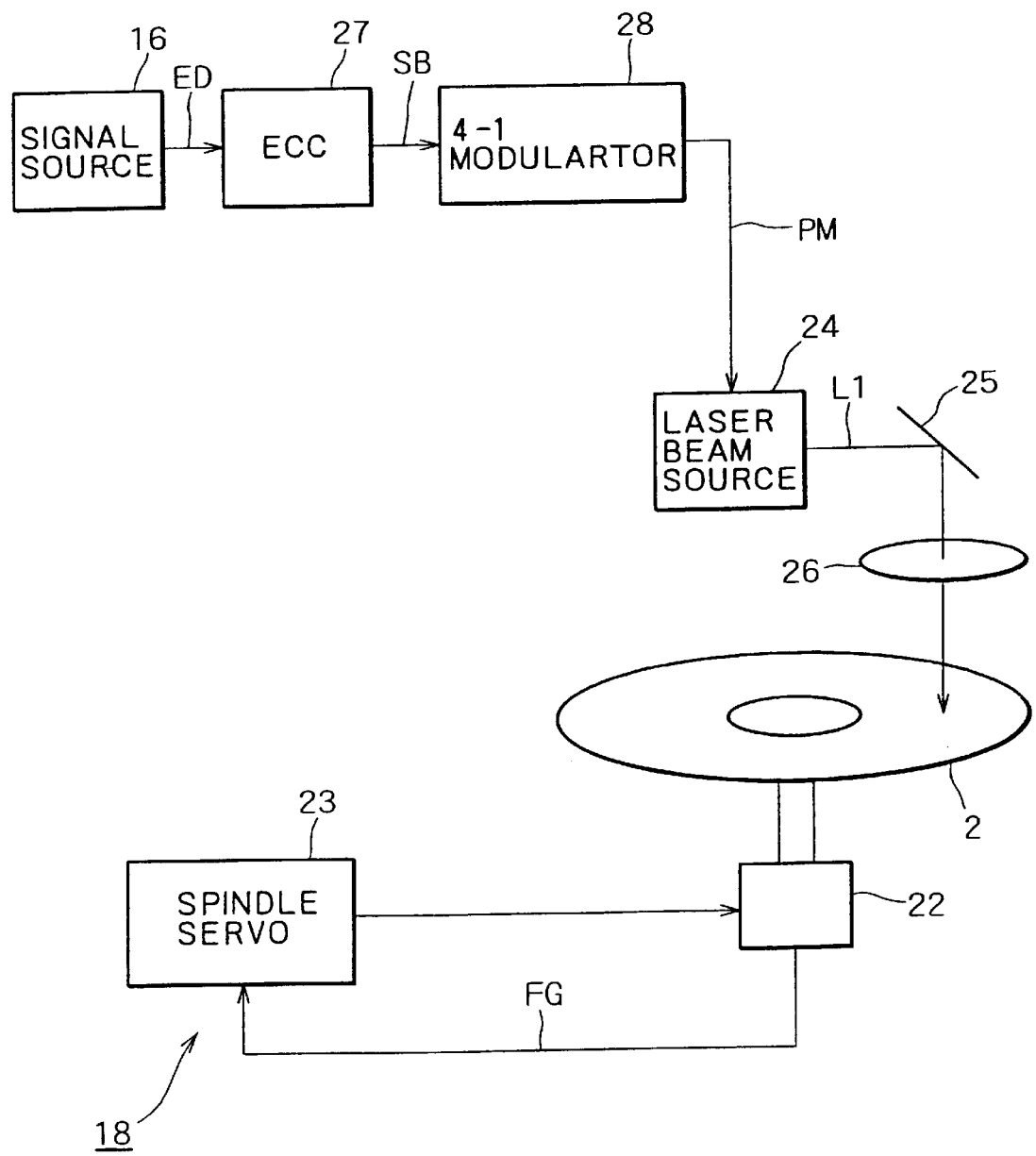

FIG. 4 is a block diagram showing the details of the 4-1 modulator 28. A serial-parallel converter 31 in the 4-1 modulator 28 receives the serial data SB, which are composed of the copyright protective information ED and the error correcting code, from the ECC circuit 27 and, after dividing the data SB in unit of 2 bits, delivers the 2-bit data (b1, b0) as its output.

A fixed pattern generator 32A repeatedly outputs a fixed pattern of logic 1000, which corresponds to logic 00 of the data (b1, b0) described in connection with FIG. 1, in synchronism with clock pulses obtained from an unshown clock generator. Similarly, fixed pattern generators 32B to 32D repeatedly output fixed patterns of logic 0100, 0010 and 0001 corresponding respectively to logic 01, 10 and 11 of the data (b1, b0) described in connection with FIG. 1.

A data selector 33 delivers the output data of the fixed pattern genertors 32A to 32D selectively in accordance with the logic values of the data (b1, b0).

A sync pattern generator 34 repeatedly outputs, in synchronism with clock pulses, a bit pattern of logic 010 corresponding to the sync pattern described in connection with FIG. 1.

A data selector 35 selectively switches, under control of a controller 36, either the output data of the data selector 33 or the output data of the sync pattern generator 34, and then delivers the selected output data. Consequently, the 4-1 modulator 28 disposes a sync pattern per 2-bit recording of the copyright protective information ED and the error correcting code.

A header generator 37 outputs a fixed pattern of logic 010001000100 corresponding to the header described in connection with FIG. 1. A data selector 38 selectively delivers either the output data of the header generator 37 or the output data of the data selector 35, whereby a modulated signal PM is so produced as to dispose a header at the top of the copyright protective information ED.

The controller 36 is a circuit for controlling the entire operation of the 4-1 modulator 28, and controls the operations of the data selectors 35 and 38 in such a manner as to dispose the header, copyright protective information ED, error correcting code and sync pattern as described in connection with FIG. 1.

Figure 5:
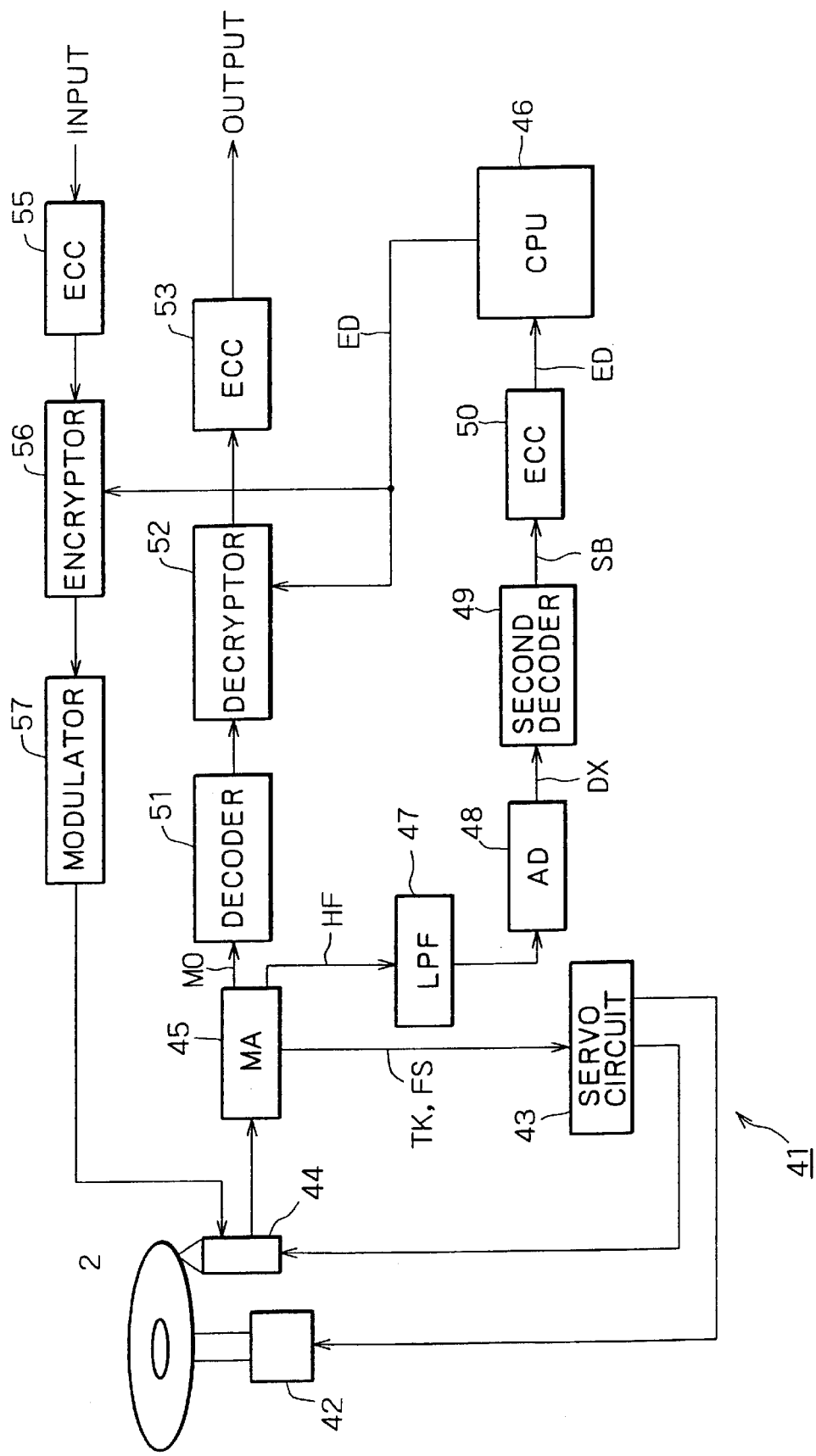
FIG. 5 is a block diagram showing an optical disk apparatus to access the mini disk of FIG. 1.

FIG. 5 is a block diagram of an optical disk apparatus for recording and reproducing the mini disk 2 manufactured as mentioned above. In this disk apparatus 41, a spindle motor 42 drives the mini disk 2 at a predetermined rotation speed under control of a servo circuit 43.

An optical pickup 44 is held by a predetermined sled mechanism in a manner to be movable in the radial direction of the mini disk 2. The optical pickup 44 irradiates a laser beam onto the mini disk 2 and, after receiving the return light therefrom, outputs the result of the received light. In a recording mode, the optical pickup 44 applies a modulating magnetic field while intermittently raising the light quantity of the laser beam over the light quantity in a reproduction mode, hence recording various information thermomagnetically by a so-called pulse train method.

A matrix amplifier (MA) 45 processes the output signal of the optical pickup 44 to produce a wobble signal changed in level with meandering of grooves, a tracking error signal TK changed in level with the amount of a tracking error, a focus error signal FS changed in level with the amount of a focus error, a reproduced signal MO changed in level with the polarization plane of the return light from the mini disk 2 through utilization of the magnetic Kerr effect, and a reproduced signal HF changed in level with change of the recording film on the mini disk 2 and also with pit rows.

The servo circuit 43 executes tracking control and focus control of the optical pickup 44 by the use of such tracking error signal TK and focus error signal FS. The servo circuit 43 also controls the rotation speed of the spindle motor 42 in a manner that clock pulses generated from the wobble signal have a predetermined frequency. Further the servo circuit 43 acquires address information out of the wobble signal and seeks the optical pickup 44 to a predetermined position under control of a central processing unit (CPU) 46.

A low pass filter (LPF) 47 limits the pass band of the reproduced signal HF to thereby suppress any variation derived from noise of the reproduced signal HF and output the reproduced signal HF.

An analog-to-digital (AD) converter 48 converts the analog reproduced signal HF, which is outputted from the low pass filter 47, into a digital signal in accordance with predetermined sampling clock pulses, and then outputs an 8-bit digital reproduced signal DX.

A second decoder 49 processes the digital reproduced signal DX to thereby reproduce the data SB composed of the copyright protective information ED and the error correction code. An error correcting circuit (ECC) 50 executes error correction of the output data SB obtained from the second decoder 49, and then outputs the copyright protective information ED.

The CPU 46 constitutes a control circuit for controlling the operation of the optical disk apparatus 41. In response to detection of the loaded mini disk 2 by an unshown mini disk detection mechanism, the CPU 46 seeks the optical pickup 44 to the lead-in area under control of the servo circuit 43 as in an ordinary mini disk apparatus, thereby acquiring TOC data necessary to access the mini disk 2. Subsequently the CPU 46 seeks the optical pickup 44 to the area ARED where the copyright protective information ED is recorded, thereby acquiring the copyright protective information ED from the error correcting circuit 50. At this time, the CPU 46 instructs the servo circuit 43 to execute access with the focus control alone while stopping the tracking control action, since the tracking control is difficult in the area ARED where the copyright protective information ED is recorded like a bar code.

The CPU 46 instructs the recording/reproducing section to perform encryption by the copyright protective information ED thus acquired, hence controlling the access to the mini disk 2 to consequently achieve effective protection of the copyrighter's profit.

More specifically, in the reproducing section, a decoder 51 reproduces the clock signal by processing the reproduced signal MO, then executes eight-to-fourteen demodulation of the reproduced signal MO with reference to the clock signal, and outputs the reproduced data.

A decryptor 52 decrypts and outputs the reproduced data with reference to the copyright protective information ED, and an error correcting circuit (ECC) 53 executes error correction of the output data obtained from the decryptor 52. Such error is derived from some defect or the like on the mini disk 2. Thus, in the optical disk apparatus 41, the audio data and so forth are reproduced through encryption unique to the mini disk 2 on the basis of the copyright protective information ED.

Meanwhile in the recording section, an error correcting circuit (ECC) 55 attaches an error correcting code to the input data received successively, and then delivers the output data. An encryptor 56 in the next stage encrypts the output data from the error correcting circuit 55 with reference to the copyright protective information ED, and a modulator 57 executes eight-to-fourteen modulation (EFM) of the output data from the encryptor 56 to thereby produce a modulated signal. This modulated signal serves to drive the modulation coil of the optical pickup 44. In this manner, the optical disk apparatus 41 records the audio data and so forth through encryption unique to the mini disk 2 on the basis of the copyright protective information ED.

Figure 6:
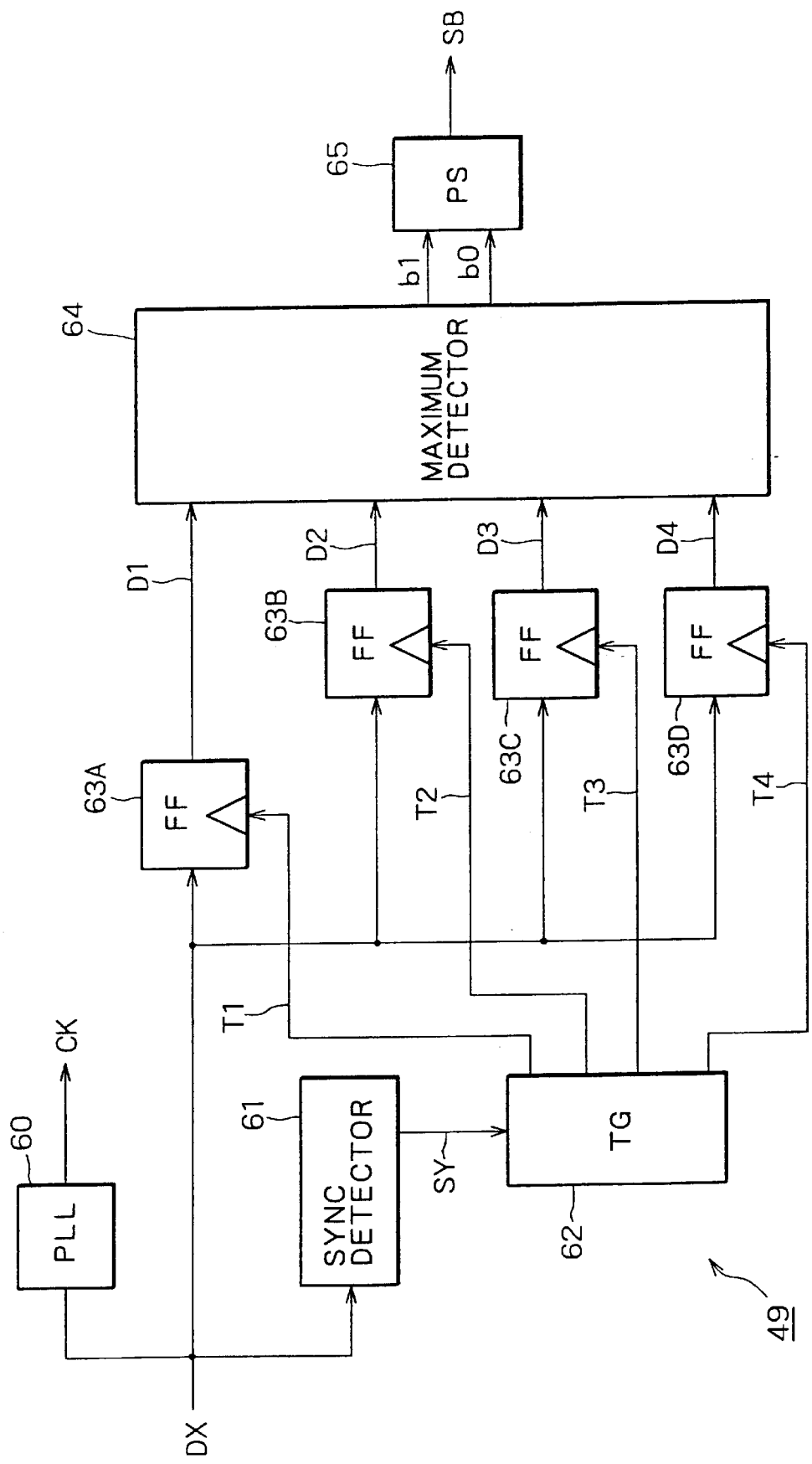
FIG. 6 is a block diagram showing a second decoder in the optical disk apparatus of FIG. 5.

FIG. 6 is a block diagram of the second decoder 49. In this second decoder 49, a PLL circuit 60 reproduces a channel clock signal CK from the digital reproduced signal DX.

A sync detector 61 decides the level of the digital reproduced signal DX with reference to the channel clock signal CK, thereby detecting a sync pattern and outputting a reset pulse SY.

A timing generator 62 produces, on the basis of such a reset pulse SY, sampling pulses T1 to T4 of which signal levels rise at a timing corresponding substantially to the center of each of the first to fourth minute sub-areas that follow the sync pattern described in connection with FIG. 1.

Flip-flop circuits (FF) 63A to 63D latch the digital reproduced signal DX with reference to the sampling pulses T1 to T4 respectively, so that the second decoder 49 enables the flip-flop circuits 63A to 63D to latch and hold the levels of the reproduced signals obtained respectively from the four minute sub-areas assigned to two bits of the copyright protective information ED and the error correcting code.

A maximum detector 64 decodes the 2-bit data (b1, b0) of the copyright protective information ED and the error correcting code in accordance with the decided values of such four latched results D1 to D4. And a parallel-serial converter (PS) converts the parallel 2-bit data (b1, b0), which are outputted successively from the maximum detector 64, into serial data.

Consequently, in the second decoder 49, the copyright protective information ED is decoded in accordance with the decided signal level values of the reproduced signals obtained with regard to the four minute sub-areas assigned for recording the copyright protective information ED, and even in case some signal level change at low frequencies is contained in the reproduced signal, it is still possible to achieve exact reproduction of the copyright protective information ED with certainty.

In processing the reproduced signal on the optical disk, it is generally customary to apply a method of binary discrimination using a predetermined threshold value. Therefore, even when the optical characteristic of the information recording plane regarding one of such four minute sub-areas is selectively changed, the copyright protective information ED may be decoded by executing binary discrimination of the reproduced signal and detecting the timing of rise of the binary discrimination result to logic 1 or the timing of fall thereof to logic 0.

However, the reproduced signal on the optical disk includes some low-frequency signal level change, and in case the four minute sub-areas extend over a long distance in the radial direction of the mini disk 2 as in this embodiment, there is possibility that such low-frequency signal level change may harmfully affect the decode result. In this embodiment, therefore, the copyright protective information ED is decoded by sampling the signal levels corresponding to the individual areas, and then comparing the sampling results mutually, whereby the copyright protective information ED can be decoded with certainty. Further, the pass band is limited in advance through the low pass filter 47 so as not to cause any error that may otherwise be induced by some noise in the numerical decision of the signal level value.

Figure 7:
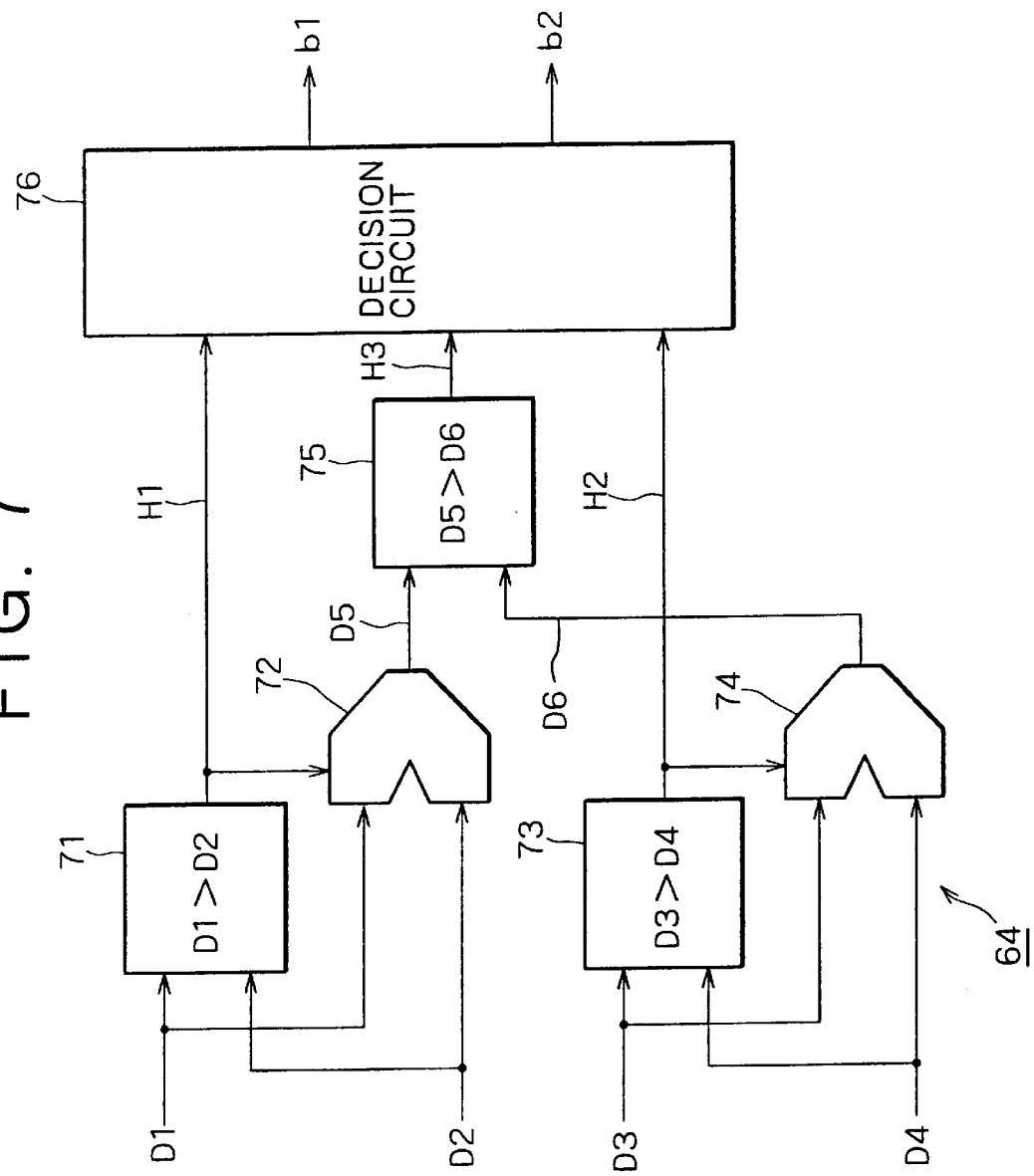
FIG. 7 is a block diagram showing a maximum detector in the second decoder of FIG. 6.

FIG. 7 is a block diagram of the maximum detector 64 which executes such numerical decision of the signal level value. In the maximum detector 64, a digital comparator 71 numerically decides the level value in response to the latch results D1 and D2 which, out of the entire four latch results D1 to D4, correspond to the two minute sub-areas near the sync pattern. The digital comparator 71 raises the logic value of the comparison result H1 if the latch result D1 near the sync pattern has a greater value out of the two latch results D1 and D2.

In accordance with the comparison result H1, a data selector 72 selectively outputs the latch result of a greater value out of the latch results D1 and D2 inputted to the digital comparator 71. In case the logic value of the comparison result H1 is high, the latch result D1 near the sync pattern is outputted. Meanwhile, in case the logic value of the comparison result H1 is low, the latch result D2 distant from the sync pattern is outputted.

A digital comparator 73 numerically decides the level value in response to the latch results D3 and D4 which, out of the entire four latch results D1 to D4, correspond to the two minute sub-areas distant from the sync pattern. The digital comparator 73 raises the logic value of the comparison result H2 in case the latch result D3 near the sync pattern out of the two latch results D3 and D4 has a greater value.

In accordance with the comparison result H2, a data selector 74 selectively outputs the latch result of a greater value out of the latch results D3 and D4 inputted to the digital comparator 73. In case the logic value of the comparison result H2 is high, the latch result D3 near the sync pattern is outputted. Meanwhile, in case the logic value of the comparison result H2 is low, the latch result D4 distant from the sync pattern is outputted.

A digital comparator 75 numerically decides the level value in response to the output data of the data selectors 72 and 74. The digital comparator 75 raises the logic value of the comparison result H3 in case the output data of the data selector 72, which corresponds to the latch result near the sync pattern, has a greater value in the output data of the data selectors 72 and 74.

On the basis of the three comparison results H1 to H3 thus obtained, a decision circuit 76 decodes the 2-bit data (b1, b0) from the detection result and then delivers its decoded output. More specifically, when the third comparison result H3 is logic 1, the maximum latch result D1 or D2 is indicated by the first comparison result H1. Therefore, in case the first comparison result H1 is logic 1, the circuit 76 judges that a pattern of logic 1000 is assigned to the four minute sub-areas, and delivers the output data (b1, b0) of logic 00. In case the first comparison result H1 is logic 0, the circuit 76 judges that a pattern of logic 0100 is assigned to the four minute sub-areas, and delivers the output data (b1, b0) of logic 01.

Meanwhile, when the third comparison result H3 is logic 0, the maximum latch result D3 or D4 is indicated by the second comparison result H2. Therefore, in case the second comparison result H2 is logic 1, the circuit 76 judges that a pattern of logic 0010 is assigned to the four minute sub-areas, and delivers the output data (b1, b0) of logic 10. And in case the second comparison result H2 is logic 0, the circuit 76 judges that a pattern of logic 0001 is assigned to the four minute sub-areas, and delivers the output data (b1, b0) of logic 11. Such relationship mentioned above can be expressed as follows.

When $H1=1, H2=*, H3=1$: $b0=0, b1=0$

When $H1=0, H2=*, H3=1$: $b0=1, b1=0$

When $H1=*, H2=1, H3=0$: $b0=0, b1=1$

When $H1=*, H2=0, H3=0$: $b0=1, b1=1$  (1)

(2) Operation of Embodiment

In the structure described above, the mini disk 2 (FIG. 2) is manufactured by first exposing a disk master 8 by means of a cutting machine 7, then producing a mother disk 12 through execution of a development step 9 and a plating step 10, and mass-producing disk substrates 14 by the use of a stamper made from the mother disk 12. Further a magneto-optical recording film and a protective film are formed on each disk substrate 14 and, after copyright protective information ED is recorded like a bar code by the bar code writer 18, the disk substrate 14 is shipped.

In the bar code writer 18, the mini disk 2 (FIG. 3) is so processed that an error correcting code is attached by the ECC circuit 27 to the copyright protective information ED outputted from the signal source 16, then a predetermined modulated signal PM is generated by the 4-1 modulator 28, and a laser beam L1 emitted from the laser beam source 24 is irradiated after being raised intermittently in accordance with the modulated signal PM. Consequently, on the mini disk 2, the copyright protective information ED is recorded as local and unreversible changes of the information recording film in a predetermined inner area ARED by unreversible changes of the reflective film or by partial removal of the reflective film. That is, the copyright protective information is recorded on the mini disk 2 by repetition of the local regions which cause, as compared with pits or marks, greater changes on the result of the received light in the reproducing mode. Since the objective lens 26 for condensing the laser beam L1 consists of a cylindrical lens, the laser beam L1 is irradiated in a radially narrow and long shape, whereby the copyright protective information ED is recorded like a bar code.

On the mini disk 2 (FIG. 1), the area ARED for recording the copyright protective information ED is divided substantially at a pitch of 50 $\mu$m in the circumferential direction to thereby define minute sub-areas. And with regard to three of entire 12 continuous minute sub-areas, local changes of the information recording plane are formed in the header by a pattern which is not generated in recording the succeeding copyright protective information ED and error correcting code.

Meanwhile for the copyright protective information ED and the error correcting code, continuous minute sub-areas posterior to the header are divided in unit of seven, and two bits of a sync pattern, the copyright protective information ED or the error correcting code are recorded in seven minute sub-areas. That is, local changes are formed to record a sync pattern with regard to the center one of the three minute sub-areas at the beginning of the seven continuous minute sub-areas And one of the remaining four minute sub-areas is selected in accordance with the copyright protective information ED or the error correcting code, and local changes are formed in the selected minute sub-area to thereby record two bits of the copyright protective information ED or the error correcting code.

In radial view of the recording area ARED for the copyright protective information ED on the mini disk 2, the copyright protective information ED is so recorded that the regions with local changes formed therein are existent at a ratio of 0.285 which is smaller than 0.3 of the whole. And even in case the copyright protective information ED is recorded by repetition of the local regions which cause greater changes in the light receiving result as compared with pits or marks, it is possible to reproduce the copyright protective information with certainty under exact focus control. And due to disposition of a sync pattern of three minute sub-areas for every four continuous minute sub-areas, the copyright protective information ED can be reproduced with certainty despite occurrence of any rotational variation or the like.

More specifically, in the conventional bar code recording, data to be recorded are processed through PE modulation to generate a modulated signal, and a laser beam is irradiated in accordance with such modulated signal, so that local changes formed in the circumferential direction of an optical disk are eventually existent at a ratio of 0.5. In this embodiment, however, the existence ratio is 0.285 which is smaller than 0.3, hence reducing the rate of time periods during which the return light of a sufficient quantity fails to be detected. Accordingly, any harmful influence on the focus servo and so forth can be decreased correspondingly to such reduction, thereby realizing satisfactory recording of the copyright protective information on the mini disk 2. Consequently, it becomes possible in the reproducing mode to achieve a stable operation of the focus servo and so forth, and design of the focus servo and the like in the reproducing apparatus can be further simplified in structure.

The mini disk 2 shipped after such recording of the copyright protective information ED is loaded in the optical disk apparatus 41 (FIG. 5), wherein a reproduced signal HF representing the return-light receiving result obtained by irradiation of a laser beam is converted into a digital reproduced signal DX by the analog-to-digital converter 48 and then is processed in the second decoder 49, hence reproducing the copyright protective information ED. And further the audio data and so forth are encrypted and recorded in accordance with the reproduced copyright protective information ED, or the reproduced audio data and so forth are decrypted in accordance therewith.

Due to the processing mentioned above, the encrypted data can be decrypted properly on the mini disk 2 where the copyright protective information ED is recorded legally, thereby enabling the user to enjoy, without any hindrance, the music performance recorded on the mini disk 2. Meanwhile on any illegal mini disk (i.e., pirate disk) where the copyright protective information ED is not recorded legally, the encrypted data fail to be decrypted properly, so that it is difficult for the user to enjoy the music recorded on the mini disk 2, hence devaluating the pirate disk. Thus, with regard to the mini disk 2, it becomes possible to prevent diffusion of pirate disks to eventually protect the copyrighter's profit.

Also when some user data are to be newly recorded, the data are encrypted in accordance with the copyright protective information ED to thereby prevent illegal copying of the data onto any pirate disk or the like.

In the second decoder 49 (FIG. 6) for the mini disk 2, a sync pattern is detected by the sync detector 61, and then the digital reproduced signal DX is sampled sequentially by the flip-flop circuits 63A to 63D in response to sampling pulses T1 to T4 based on the detection of the sync pattern, whereby the level of the reproduced signal HF is detected with regard to each of the four minute sub-areas assigned to recording of the copyright protective information ED and the error correcting code. Further in the maximum detector 64 (FIG. 7), the four sampling results thus obtained are compared successively, then a decision is made as to which of the four minute sub-areas is assigned to the regions with local changes, and the copyright protective information ED and the error correcting code are decoded successively in accordance with the result of such decision.

Thus, on the mini disk 2, erroneous decoding that may be derived from DC level variations as in decoding the copyright protective information ED by mere binary discrimination can be avoided effectively to thereby realize exact reproduction of the copyright protective information ED even in case the copyright protective information ED is recorded like a bar code at a relatively low transmission rate.

(3) Effects of Embodiments

According to the structure described above, when recording the information of copyright by repetition of local regions which cause greater changes in the light receiving result as compared with pits or marks, the existence ratio of such local regions in the circumferential direction is set to be less than 0.3, so that even in the case of recording the information of copyright like a bar code for example, any abnormal function of the focus servo and so forth can be effectively avoided to ensure exact reproduction of the copyright protective information ED.

Further, a sync pattern is disposed in recording four continuous minute sub-areas in unit of two bits, whereby the copyright protective information ED can be reproduced with certainty despite occurrence of any rotational variations or the like.

In addition, the information of copyright recorded on the mini disk is reproduced by comparing the sampling results which are obtained by sampling the light receiving results at predetermined timings, hence effectively avoiding erroneous decoding that may be induced by DC level variations as in decoding the copyright protective information ED through mere binary discrimination. Consequently, even in the case of recording the copyright protective information ED like a bar code at a relatively low transmission rate, it is still possible to achieve exact reproduction of the copyright protective information ED.

(4) Other Embodiments

The foregoing embodiment mentioned above represents an exemplary case of assigning two bits of copyright protective information ED to four continuous minute sub-areas and selecting one of such four minute sub-areas to cause local changes in the information recording film. However, the present invention is not limited thereto alone, and such numerical values may be altered in compliance with various requirements.

Also in the above embodiment, there is described a case of changing one minute sub-area entirely. However, the present invention is not limited to this example alone, and one minute sub-area may be changed partially so as to further reduce the influence on the focus servo and so forth.

Further in the above embodiment, there is described a case of recording the copyright protective information ED by forming local changes through change or removal of the reflective film. However, the present invention is not limited thereto alone, and the copyright protective information ED may be recorded like a bar code by, for example, locally coarsening the surface of the disk substrate 14 or locally removing some pit rows to thereby change the information recording plane optically.

Further in the above embodiment, there is described a case of recording the copyright protective information ED by irradiation of a YAG laser. However, the present invention is not limited to this example alone, and it is possible to use a carbonic acid gas ($CO_2$) laser, a high-output semiconductor laser or the like.

Further in the above embodiment, there is described a case of decoding the copyright protective information ED by detecting the maximum value in the maximum detector 64 on the premise of a reproducing system where the level of a reproduced signal HF rises in the region having a change of the reflective film. However, the present invention is not limited to this example alone, and in the reproducing system, there may be another case where, contrary to the above, the level of the reproduced signal HF falls in the region having a change of the reflective film. In this case, the copyright protective information ED can be reproduced with certainty by detecting the minimum value instead of the maximum value in the maximum detector, or by inserting an inverting amplifier in the reproduced signal processor.

Also in the above embodiment, there is described a case of applying the invention to a mini disk which is an optical disk adapted for both recording and reproduction. However, the present invention is not limited to this example alone, and it is applicable also to a magneto-optical disk or a phase change type optical disk similarly adapted for both recording and reproduction, and further to a write-once type optical disk or a reproduction-only optical disk as well.

Also in the above embodiment, there is described a case of controlling access to an optical disk through a process of encryption using information of copyright. However, the present invention is not limited to this example alone, and it is widely applicable to control of access to an optical disk by stopping, under control, the operation of a recording/reproducing section, or to control of access to an optical disk by stopping the output of the reproduced signal.

Further in the above embodiment, there is described a case of assigning unique information as copyright information to an optical disk. However, the present invention is not limited thereto alone. And when audio data or the like are to be recorded for sale, copyright information may be composed of specific information unique to the relevant artist for example.

Thus, according to the present invention wherein information of copyright is recorded by repeatedly forming local regions which cause greater changes in the light receiving result as compared with pits or marks, the existence ratio of such local regions in the circumferential direction is set to be less than 0.3. Therefore, even in case the copyright information is recorded like a bar code for example, the information can be reproduced exactly with certainty.

While the preferred embodiment of the present invention has been described using specific terms, such description is for illustrative purposes only, and it is to be understood that changes and variations may be made without departing from the spirit or scope of the following claims.

What is claimed is:

1. An optical disk apparatus for recording information of copyright on an optical disk where desired data are recorded by repetition of pits or marks, said apparatus comprising:
   a recording means for recording the copyright information by irradiating a laser beam onto said optical disk in such a manner as to repeatedly form, in a predetermined area of said optical disk, local regions which cause greater changes in the return-light receiving result as compared with the pits or marks,
   wherein the existence ratio of said local regions in the circumferential direction of said optical disk is set to be less than 0.3.

2. The optical disk apparatus according to claim 1, wherein said predetermined area is divided into a plurality of minute sub-areas in the circumferential direction, and said recording means forms the local regions in n minute sub-area in regard to the copyright information in continuous m minute sub-areas.

3. The optical disk apparatus according to claim 2, wherein said m is four, and said n is one.

4. The optical disk apparatus according to claim 2, wherein said recording means disposes a sync pattern by selectively forming the local regions in at least one of the continuous minute sub-areas of a predetermined number immediately anterior to said m minute sub-areas.

5. The optical disk apparatus according to claim 1, wherein said recording means forms the local regions by unreversibly changing the reflective film of said optical disk.

6. The optical disk apparatus according to claim 1, wherein said recording means forms the local regions by partially removing the reflective film of said optical disk.

7. The optical disk apparatus according to claim 1, wherein said recording means forms the local regions by locally changing the disk substrate of said optical disk.

8. The optical disk apparatus according to claim 1, wherein said recording means records the copyright information like a bar code by forming said local regions.

9. An optical disk recording method for recording information of copyright on an optical disk where desired data are recorded by repetition of pits or marks to be reproduced, said recording method comprising the steps of:

irradiating a laser beam onto said optical disk in such a manner as to repeatedly form, in a predetermined area of said optical disk, local regions which cause greater changes in the return-light receiving result as compared with the pits or marks, thereby recording the copyright information in said local regions, wherein the existence ratio of said local regions in the circumferential direction of said optical disk is set to be less than 0.3.

10. An optical disk on which desired data are recorded by repetition of pits or marks, and the data thus recorded by repetition of the pits or marks are reproduced by processing the return-light receiving result obtained by irradiation of a laser beam, wherein said optical disk has a predetermined area in which information of copyright is recorded by repeatedly forming, with irradiation of a laser beam, local regions that cause greater changes in the return-light receiving result as compared with the pits or marks, and the existence ratio of said local regions in the circumferential direction of said optical disk is less than 0.3.

11. The optical disk according to claim 10, wherein said predetermined area has minute sub-areas divided in the circumferential direction, and the local regions are formed in n minute sub-area corresponding to the copyright information in continuous m minute sub-areas.

12. The optical disk according to claim 11, wherein said m is four, and said n is one.

13. The optical disk according to claim 11, wherein a sync pattern is disposed by selectively forming the local regions in at least one of continuous k minute sub-areas immediately anterior to said m minute sub-areas.

14. The optical disk according to claim 13, wherein said k is three.

15. The optical disk according to claim 10, wherein said local regions are formed by unreversibly changing the reflective film of an information recording plane.

16. The optical disk according to claim 10, wherein said local regions are formed by partially removing the reflective film of the information recording plane.

17. The optical disk according to claim 10, wherein said local regions are formed by local changes of the disk substrate.

18. The optical disk according to claim 10, wherein the copyright information is recorded like a bar code in said local regions.

19. An optical disk apparatus capable of accessing an optical disk where data are recorded by rows of pits or marks, comprising:

an optical system for irradiating a laser beam onto said optical disk and outputting the result of receiving the return light therefrom;

a copyright information reproducing means for reproducing the copyright information, which is recorded on said optical disk, in accordance with sampling results obtained by sampling the return-light receiving result at predetermined timings; and a control means for controlling the access to said optical disk in accordance with the copyright information.

20. The optical disk apparatus according to claim 19, wherein said copyright information reproducing means comprises a sync pattern detection means for detecting, from the light receiving result, a sync pattern included in the copyright information; a sampling pulse generation means for generating a plurality of sampling pulses in accordance with the detection results obtained from said sync pattern detection means; a plurality of sampling means for sampling the light receiving result with reference to each of the sampling pulses; and a comparison means for comparing the sampling results obtained from said plurality of sampling means, and outputting a comparison result;

wherein the copyright information is outputted in accordance with the comparison result obtained from said comparison means.

21. The optical disk apparatus according to claim 19, wherein the access to said optical disk is controlled by encryption of the input/output data for said optical disk in accordance with the copyright information.

* * * * *